United States Patent
Odendall (10) Patent No.: US 6,823,666 B2
(45) Date of Patent: Nov. 30, 2004

(54) PROCESS FOR HEATING A SOOT FILTER IN AN EXHAUST GAS SYSTEM OF AN INTERNAL COMBUSTION ENGINE, PARTICULARLY A DIESEL ENGINE, WITH AT LEAST ONE CATALYTIC CONVERTER AND A SOOT FILTER MOUNTED DOWNSTREAM FROM THE ENGINE FOR ACCUMULATION OF THE SOOT

(75) Inventor: Bodo Odendall, Neuburg (DE)

(73) Assignee: Audi AG (DE)

(*) Notice: Subject to any disclaimer, the term of this patent is extended or adjusted under 35 U.S.C. 154(b) by 0 days.

(21) Appl. No.: 10/441,056

(22) Filed: May 20, 2003

(65) Prior Publication Data
US 2004/0040292 A1 Mar. 4, 2004

(30) Foreign Application Priority Data
Aug. 27, 2002 (EP) .......................... 02018981

(51) Int. Cl.⁷ .................................. F01N 3/00
(52) U.S. Cl. ..................... 60/297; 60/274; 60/276; 60/285; 60/311; 423/213.7
(58) Field of Search .................. 60/274, 285, 286, 60/295, 297, 300, 303, 311, 276; 422/169, 170, 171, 177; 423/213.2, 213.7

(56) References Cited

U.S. PATENT DOCUMENTS

| | | | |
|---|---|---|---|
| 5,207,990 A | 5/1993 | Sekiya et al. ............. 422/183 |
| 5,746,989 A * | 5/1998 | Murachi et al. ........ 423/213.7 |
| 6,233,927 B1 * | 5/2001 | Hirota et al. ................ 60/297 |
| 6,293,096 B1 * | 9/2001 | Khair et al. ................. 60/286 |
| 6,304,815 B1 * | 10/2001 | Moraal et al. .............. 701/115 |
| 6,412,276 B1 * | 7/2002 | Salvat et al. ................. 60/295 |
| 6,546,721 B2 * | 4/2003 | Hirota et al. ................. 60/297 |
| 2002/0053202 A1 | 5/2002 | Akama et al. ............... 60/297 |
| 2003/0115859 A1 * | 6/2003 | Deeba ........................ 60/297 |
| 2003/0140620 A1 * | 7/2003 | Shigapov et al. ............ 60/286 |
| 2003/0167756 A1 * | 9/2003 | Szymkowicz ................ 60/289 |

FOREIGN PATENT DOCUMENTS

| | | | | |
|---|---|---|---|---|
| DE | 196 18 397 | 11/1997 | ............ F01N/3/02 |
| DE | 100 33 159 | 1/2002 | ............ F01N/3/035 |
| FR | 2 774 422 | 8/1999 | ............ F01N/3/02 |
| FR | 2 774 427 | 8/1999 | ............ F02D/41/30 |
| JP | 08042326 | 2/1996 | ............ F01N/3/02 |
| WO | WO 01/04466 | 1/2001 | ............ F01N/3/021 |

\* cited by examiner

Primary Examiner—Tu M. Nguyen
(74) Attorney, Agent, or Firm—Stevens, Davis, Miller & Mosher, LLP (57) ABSTRACT

A process for heating a carbon filter in an exhaust gas system of an internal combustion engine, in particular a diesel engine, with at least one catalytic converter and a carbon filter mounted downstream from the catalytic converter in the direction of flow for accumulating carbon. The catalytic converter mounted upstream from the carbon filter is heated to the extent that the amount of heat from the catalytic converter introduced into the carbon filter heats the carbon filter to the extent that combustion of the carbon is initiated.

17 Claims, 7 Drawing Sheets

FIG.2b  State of the Art

PROCESS FOR HEATING A SOOT FILTER IN AN EXHAUST GAS SYSTEM OF AN INTERNAL COMBUSTION ENGINE, PARTICULARLY A DIESEL ENGINE, WITH AT LEAST ONE CATALYTIC CONVERTER AND A SOOT FILTER MOUNTED DOWNSTREAM FROM THE ENGINE FOR ACCUMULATION OF THE SOOT

FIELD OF INVENTION

The invention relates to a process for heating a soot filter in an exhaust gas system of an internal combustion engine, particularly a diesel engine, with at least one catalytic converter and a soot filter mounted downstream from the engine for accumulation of the soot.

BACKGROUND OF THE INVENTION

The use of carbon filters in the exhaust gas systems of diesel engines is of the state of the art. In order to ensure the efficiency of the carbon filter it is necessary replace or recondition this filter from time to time. Burning of the carbon accumulated in the carbon filter for the purpose of reconditioning is of the state of the art. The temperature in the carbon filter required for this purpose in a diesel engine, if it exists at all, can be introduced into the engine only at great cost. DE 196 18 397 A1, for example, discloses moistening of the accumulated carbon with additional fuel and accordingly lowering of the temperature required. This entails not only additional expense for delivery of the fuel but also application of additional measures to prevent undesirable ignition in the carbon filter area.

SUMMARY OF THE INVENTION

The invention pursues the object of low-cost heating of a carbon filter in the exhaust gas system of an internal combustion engine, a diesel engine in particular, for the purpose of initiating burning of the carbon.

It is claimed for the invention that this object is attained by the process of the present invention for heating a carbon filter in the exhaust gas system of an internal combustion system, of a diesel engine in particular, with at least one catalytic converter and a carbon filter mounted downstream from this converter for accumulation of carbon as specified in claim 1, an exhaust gas system such that the catalytic converter mounted upstream from the carbon filter is heated to the point that the amount of heat introduced from the catalytic converter into the carbon filter is introduced into the carbon filter to the extent that combustion of the carbon is initiated. The heat to be introduced for initiation of carbon combustion may as a result be produced by simple means structurally near the carbon filter and independently of the layout and design of the engine. Reliable processes already disclosed for the heating of catalytic converters may be applied for heating. Even in the case of diesel engines with their low aptitude for adequate introduction of heat from the engine into the carbon filter, the process is simple and reliable in application without introduction of additional fuel into the carbon filter. The thermal losses are slight because of the structural proximity.

In a second embodiment, preference is to be given the process for heating a carbon filter in an exhaust gas system of an internal combustion engine, a diesel engine in particular, with at least one catalytic converter and a carbon filter mounted downstream from the carbon filter in this catalytic converter for accumulation of carbon as in which the catalytic converter mounted upstream from the carbon filter is heated by exothermal reaction in the catalytic converter mounted upstream from the carbon filter to the extent that the amount of heat introduced from the catalytic converter into the carbon filter heats the carbon filter to the point that combustion of the carbon is initiated. The heat initiating carbon combustion may as a result be generated directly in the exhaust gas system mounted upstream from the carbon filter in the structural vicinity of the carbon filter and independently of the layout and design of the engine and of additional heating means. The resulting thermal losses are especially small.

Especially advantageous is the process for heating of a carbon filter in an exhaust gas system of an internal combustion engine, a diesel engine in particular, with several catalytic converters mounted in the direction of exhaust gas flow and a carbon filter mounted downstream from them for accumulation of the carbon, as specified in a further embodiment, the catalytic converter mounted downstream in the direction of flow and immediately upstream from the carbon filter being heated to the point that the exothermal reaction is transferred from a catalytic converter mounted upstream in the direction of flow, in particular for initiation of detoxification of the catalytic converter mounted downstream from it, to the catalytic converter mounted downstream, and the heat from the catalytic converter mounted downstream in the direction of flow and mounted immediately upstream from the carbon filter being introduced into the carbon filter. In this way heating of the carbon filter mounted downstream but upstream from the catalytic converter is effected by design. Energy losses due to introduction of thermal energy by heat transfer and heat conduction from the exterior and the associated dangers of overheating of other components, upstream catalytic converters in particular, are prevented. Since heating results exclusively from transfer of the exothermal reaction from the catalytic converter mounted upstream to the catalytic converter mounted downstream, the only reactions used are those which take place in any event in conventional gas cleaning by two catalytic converters mounted in sequence in the direction of flow. Consequently, the catalytic converter mounted downstream—and the carbon filter mounted downstream from it—may be heated for introduction of carbon combustion in a very simple manner, with no additional reactions and with no additional means required for limiting the temperature of other components. The process permits very low energy consumption and accordingly low-consumption engines.

In a further embodiment, the displacement may be effected as desired by simple means through $\lambda$ value control with an alternating rich/lean operating cycle of the internal combustion engine and accordingly heating of the downstream catalytic converter. Exhaust emissions may be kept at a low level under control as desired.

In still a further embodiment, the $\lambda$ value is adjusted for heating so that rich-mixture operation with $\lambda<1$ is always maintained somewhat longer than the time allowing the $O_2$ in the oxygen reservoir of the catalyst mounted upstream to convert the pollutants HC and CO, so that the conversion is effected at least in part by the $O_2$ stored in the oxygen reservoir of the catalytic converter mounted downstream, and wherein the two oxygen reservoirs are refilled during lean-mixture operation with $\lambda>1$, which makes possible very simple transfer of reduction of the pollutants HC and CO carried out in the catalytic converter mounted upstream for cleaning of the gas in normal operation to the catalytic converter mounted downstream, as a result of which the catalytic converter mounted downstream is heated. The pollutants may undergo decomposition unchanged.

By preference the λ value is regulated for heating so that for λ the statement $0.95 \geq \lambda \geq 0.9$ is valid during heating. As a result of the operation with a very rich mixture, the exothermal reaction is transferred in a short time to the catalytic converter mounted downstream, so that the required temperature is reached in a short time.

In a further embodiment, control of the rich-lean operating cycle is exerted by means of $O_2$ sensors, λ probes in particular, which check the exhaust gas in a position downstream from the catalytic converter, which permits highly sensitive regulation of the rich-mixture/lean-mixture operating cycle and accordingly control of both heating and exhaust gas composition. In other embodiments, the exhaust gas boundary values can be dependably adhered to and yet temperature increase safe for operation may be achieved by simple means.

In yet a further embodiment, the upstream catalyst is an oxidation catalyst and the downstream catalytic converter is a $NO_x$ adsorber wherein the $NO_x$ adsorber is heated, in particular to the desulfatization temperature, by shifting the exothermal reaction from the oxidation catalyst (3) to the $NO_x$ adsorber, which makes it possible to heat the carbon filter for initiation of carbon combustion without overheating of the oxidation catalyst.

In still a further embodiment, which the upstream catalyst is an oxidation catalyst and the downstream catalytic converter is a three-way catalytic converter with oxygen reservoir, wherein the three-way catalytic converter is heated by shifting the exothermal reaction from the first oxidation catalyst to the three-way catalytic converter, which makes it possible to promote carbon generation very advantageously by $NO_x$ formation.

BRIEF DESCRIPTION OF THE DRAWINGS

The invention is discussed in detail in what follows on the basis of FIGS. 1 to 7 with reference to the example of a direct-injection diesel engine; in the figures.

DETAILED DESCRIPTION OF THE INVENTION

Figure 1:
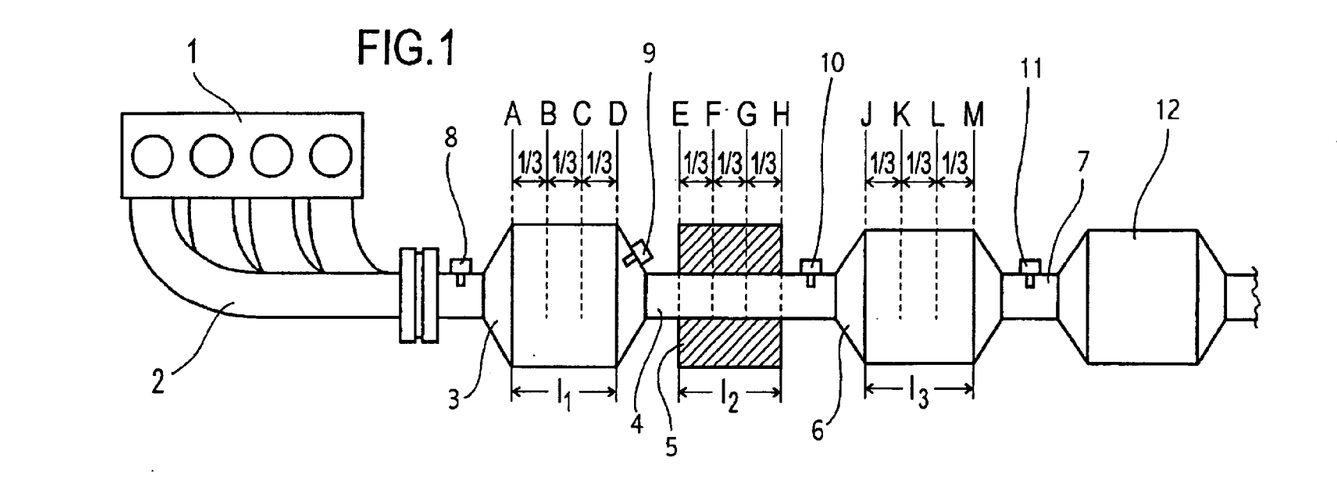
FIG. 1 presents a diagram of the structure of an exhaust system of a direct-injection diesel engine.

FIG. 1 shows an exhaust gas system, using the example of a direct-injection diesel engine. Exhaust gases are conducted as in the state of the art from the internal combustion engine 1 by way of exhaust pipes 2, an oxidation catalyst 3, an exhaust pipe 4, a $NO_x$ adsorber 6 or by way of a three-way catalytic converter and a carbon filter 12 and an exhaust pipe 7. Mounted upstream from the oxidation catalyst 3 is a wide-angle lambda probe 8, and downstream from it a conventional lambda probe 9 by means of which variations of the λ value of the exhaust gases upstream and downstream from the oxidation catalyst 3 from the stoichiometric value λ=1 are registered. Similarly, there is mounted downstream from the $NO_x$ adsorber 6, as in the state of the art, a lambda probe 11 which registers variations of the λ value from the stoichiometric value λ=1 downstream from the $NO_x$ adsorber 6. As in the state of the art, the exhaust pipe 4 extends between the oxidation catalyst 3 and the $NO_x$ adsorber 6 and optionally through an exhaust gas cooler 5 of conventional design, while a temperature sensor 10 is mounted upstream from the $NO_x$ adsorber 6 for registration of the temperature at the intake of the exhaust gas into the $NO_x$ adsorber 6. The oxidation catalyst 3 is conventionally designed with a maximum temperature limit of 950° C., the $NO_x$ adsorber 6 with a maximum temperature limit of 750° C. The operating range of the $NO_x$ adsorber 6 conventionally ranges from 250° C. to 450° C.

To illustrate the temperature variations, the length $l_1$ of the oxidation catalyst is divided in FIG. 1 into three equal segments. The position at the beginning of the catalytic converter is designated as A, the position at one-third of the length $l_1$ as B, the position at two-thirds of the length $l_1$ as C, and the position at the end of $l_1$ as D. Similarly, the exhaust gas cooler 5, of length $l_2$, is divided into three segments of equal length, E designating the intake of the exhaust gas cooler 5, F the position at one-third of $l_2$, G the position at two-thirds of $l_2$, and H the position at the end of the exhaust gas cooler 5. Similarly, the length $l_3$ of the $NO_x$ adsorber 6 is divided into three equal segments, J designating the position at the beginning of the $NO_x$ adsorber 6, K the position at one-third $l_3$, L the position at two-thirds $l_3$, and M the position at the outlet of the $NO_x$ adsorber 6.

The temperature pattern over time illustrated in FIGS. 2a, 2b, 4, and 6 may be determined, for example, by means of the calorific value input. The λ signal upstream from the oxidation catalyst 3 and downstream from the $NO_x$ adsorber 6 is used for more precise determination of the calorific value input to the $NO_x$ adsorber 6. The calorific value input to the $NO_x$ adsorber 6 is obtained from the broadband signal of the lambda probe 8 upstream from the oxidation catalyst 3 and the period of time between the rich-mixture breakdown of the lambda probe 11 downstream from the oxidation catalyst 3 and the rich-mixture breakdown of the lambda probe downstream from the $NO_x$ adsorber 6. To prevent a rich-mixture penetration a maximum time until shortly before breakdown for the rich-mixture operation phase is plotted in a characteristic diagram of the exhaust gas mass. The temperature in the $NO_x$ adsorber 6 is calculated from the calorific value input to the $NO_x$ adsorber 6 and the temperatures upstream from the $NO_x$ adsorber 6 measured by the temperature sensor 10.

The time to rich-mixture penetration may be compared to the times plotted in the characteristic diagram.

Figure 2A:
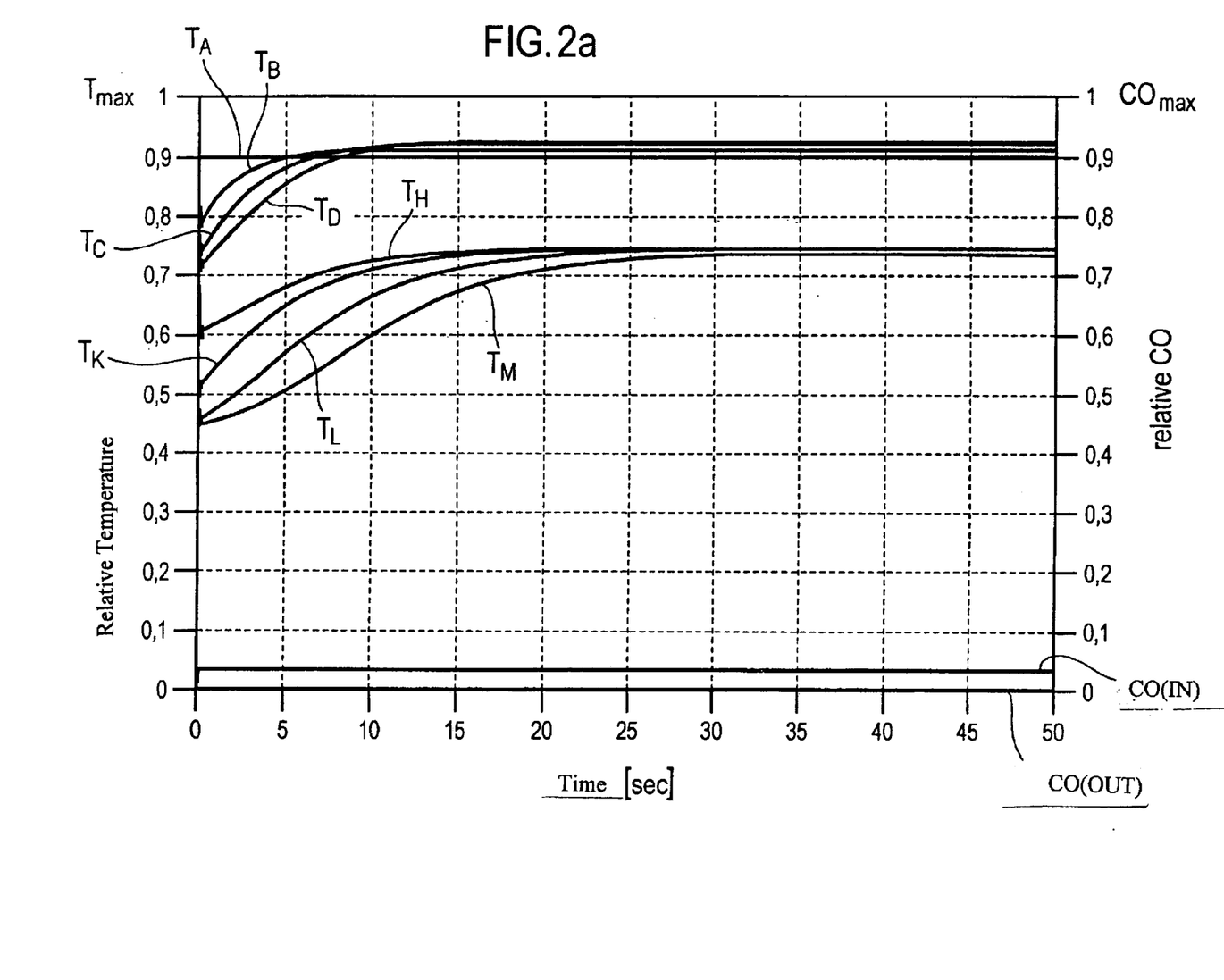
FIG. 2a illustrates the heating behavior of the exhaust gas system shown in FIG. 1 without transfer of the exothermal reaction to the catalytic converter mounted downstream as claimed for the invention with relative temperature distribution at a speed of 200 km/hr.
Figure 2B:
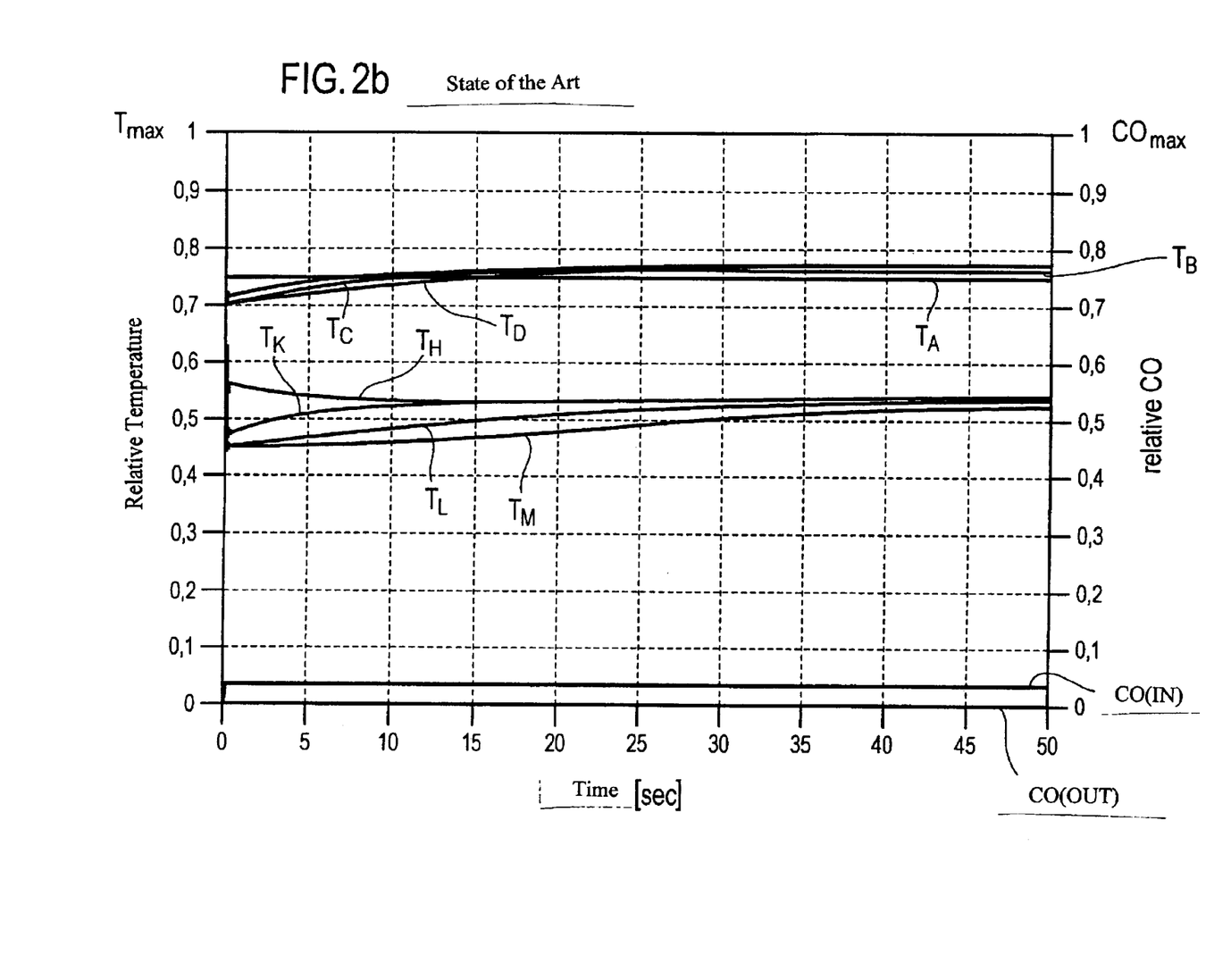
FIG. 2b illustrates the heating behavior of the exhaust gas system shown in FIG. 1 without transfer of the exothermal reaction to the catalytic converter mounted downstream as claimed for the invention with relative temperature distribution at a speed of 120 km/hr.

FIGS. 2a and 2b illustrate the temperature pattern over time TA, TB, TC, TD, TH, TK, TL, TM in the positions A, B, C, D, H, K, L, M and, by way of example for the exhaust gas pollutants CO, HC, and $NO_x$, the measured CO values at the intake of the oxidation catalyst 3 as measured by the wide-angle lambda probe 8, and the pattern over time of the measured CO values downstream from the $NO_x$ adsorber 6 as measured by the lambda probe 11, in an attempt to achieve a temperature increase in order to initiate desulfatization without application of other measures.

It is to be seen from FIG. 2a that, under full load at a speed of 200 km/hr, the combustion energy introduced by the internal combustion engine 1 into the oxidation catalyst 3 located in proximity to the engine generates temperatures which, starting at the input temperature TA in the oxidation catalyst 3 in plane A at constant $0.9 \cdot T_{max}$ are still below this temperature in the positions downstream in the direction of exhaust gas transport, the temperatures TB, TC, and TD rising to values between $0.9 \cdot T_{max}$ and $0.95 \cdot T_{max}$ in a short time in the oxidation catalyst 3 because of the exothermal reaction in the oxidation catalyst 3. After some delay the temperatures TK in position K, TL in position L, and TM in position M of $NO_x$ adsorber 6 also rise from the optimum operating range of the $NO_x$ adsorber 6 of $0.25 \cdot T_{max}$ to $0.45 \cdot T_{max}$ and reach values of up to $0.75 \cdot T_{max}$, so that initiation of carbon combustion in the direct upper temperature boundary range is possible in this full-load case.

FIG. 2b illustrates the same exhaust gas system in the same engine, but in partial-load operation at a speed of 120 km/hr.

It is to be seen from the diagrams that the temperatures TA, TB, TC, TD in the planes A, B, C, D of the oxidation catalyst 3 assume only values of up to $0.75 \cdot T_{max}$ because of the distinctly lower input temperature TA, while the temperatures TK, TL, TM in positions K, L, M of the $NO_x$ adsorber 6 assume values below $0.55 \cdot T_{max}$. Consequently, initiation of carbon combustion does not take place in the partial-load range.

Figure 3:
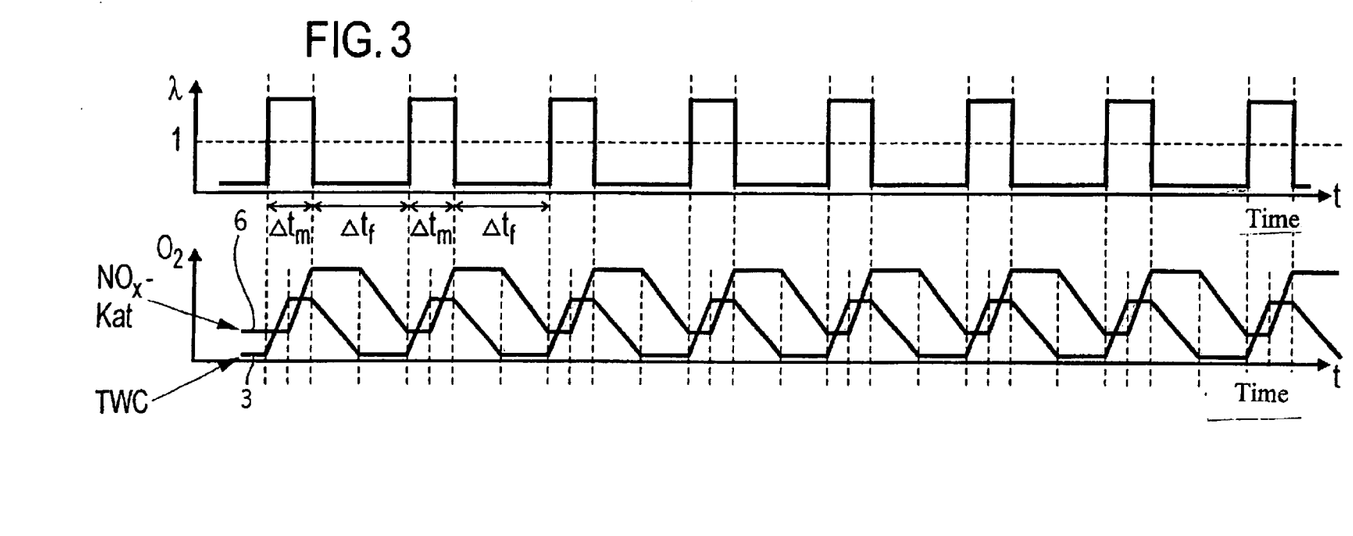
FIG. 3 a diagram illustrating the principle of operation of the variation of the λ value for heating, along with the λ value variation and the resulting changes in the $O_2$ reservoir content of the catalytic converter mounted upstream and that mounted downstream.

The heating claimed for the invention to a temperature for initiation of carbon combustion of an exhaust gas system shown in FIG. 1 is illustrated by way of diagrams in FIGS. 3 to 6. A brief cyclic λ value variation as illustrated in FIG. 3, for example, takes place for heating the $NO_x$ adsorber 6 and the carbon filter 12. For this purpose the engine is operated periodically for engine heating with a rich or lean mixture after predetermined driving distances such as 5,000 or 10,000 km after which initiation of carbon combustion is desired. The heating period should be minimized as much as possible. For example, this period ranges from 20 seconds to 2 minutes, depending on the temperature under load and the initial temperature of the carbon filter 12. During the period of rich-mixture operation, $\Delta t_f$, the engine is operated at a λ value to which the statement $0.95 \geq \lambda \geq 0.9$, 0.92 for example, applies. Over the brief period $\Delta t_m$ of lean-mixture operation with $3 \geq \lambda \geq 1.1$ as much $O_2$ as possible is introduced into the oxidation catalyst 3 and into the $NO_x$ adsorber 6. The periods during which the engine is to be operated with a rich or lean mixture are plotted in a characteristic diagram of the gas intake temperature, the engine air mass, and the λ value for rich or lean mixture operation.

As is shown in FIG. 3, a cyclic charging and discharging of the oxygen reservoir take place in the oxidation catalyst 3 and in the $NO_x$ adsorber 6, charging of the oxidation catalyst 3 beginning with commencement of the lean-mixture phase (λ>1) and discharge of the oxidation catalyst 3 beginning with commencement of rich-mixture operation. Charging and discharging of the $NO_x$ adsorber 6 is phase-shifted relative to the cycle of the oxidation catalyst 3.

Figure 4:
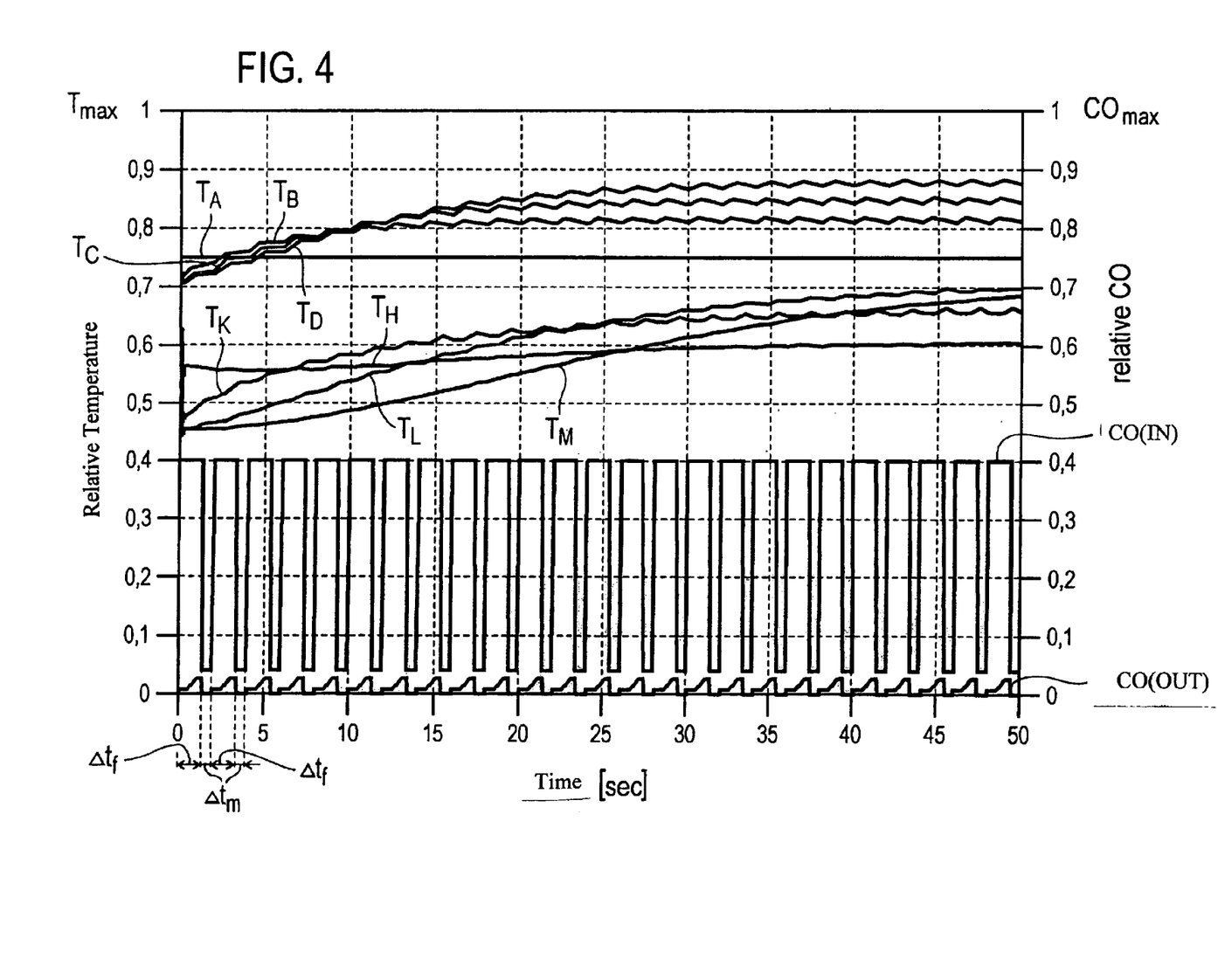
FIG. 4 a diagram illustrating the relative temperature distribution in the case of variation of the λ value claimed for the invention for heating, at a speed of 120 km/hr.

FIG. 4 illustrates the temperature pattern in the oxidation catalyst 3 and in the $NO_x$ adsorber 6, as well as the CO emissions upstream (CO EIN) and downstream (CO AUS) from the exhaust gas system in partial load operation at a speed of 120 km/hr. The rich-lean mixture cycle selected is such that the rich-mixture cycle in this example is $\Delta t_f$=1.5 seconds and the lean-mixture cycle $\Delta t_m$=0.5 second. As is clearly to be seen in FIG. 4 for positions B, C, D of the oxidation catalyst 3 and for positions K, L, M of the $NO_x$ adsorber 6 of FIG. 1, the temperatures TB, TC, TD, TK, TL, TM associated with these positions rise in the rich-mixture phases. Consequently, the exothermal reaction in the $NO_x$ adsorber 6 leads even after a brief period to a rise also in the temperatures TK, TL, TM in a range above $0.65 \cdot T_{max}$ as a result of the exothermal combustion involving use of the oxygen accumulated in the oxidation catalyst 3 and in the $NO_x$ adsorber 6. In the example illustrated approximately 50 percent of the exothermal combustion components of CO and HC of the oxidation catalyst 3 is displaced to the $NO_x$ adsorber 6. The oxygen reservoirs of the oxidation catalyst 3 and the $NO_x$ adsorber 6 are filled with $O_2$ in the lean-mixture phases. Consequently, the λ value variation illustrated in FIG. 3 causes a part of the residual calorific value in the rich-mixture exhaust gas to be converted to heat, not in the oxidation catalyst 3 but in the $NO_x$ adsorber 6.

Figure 6:
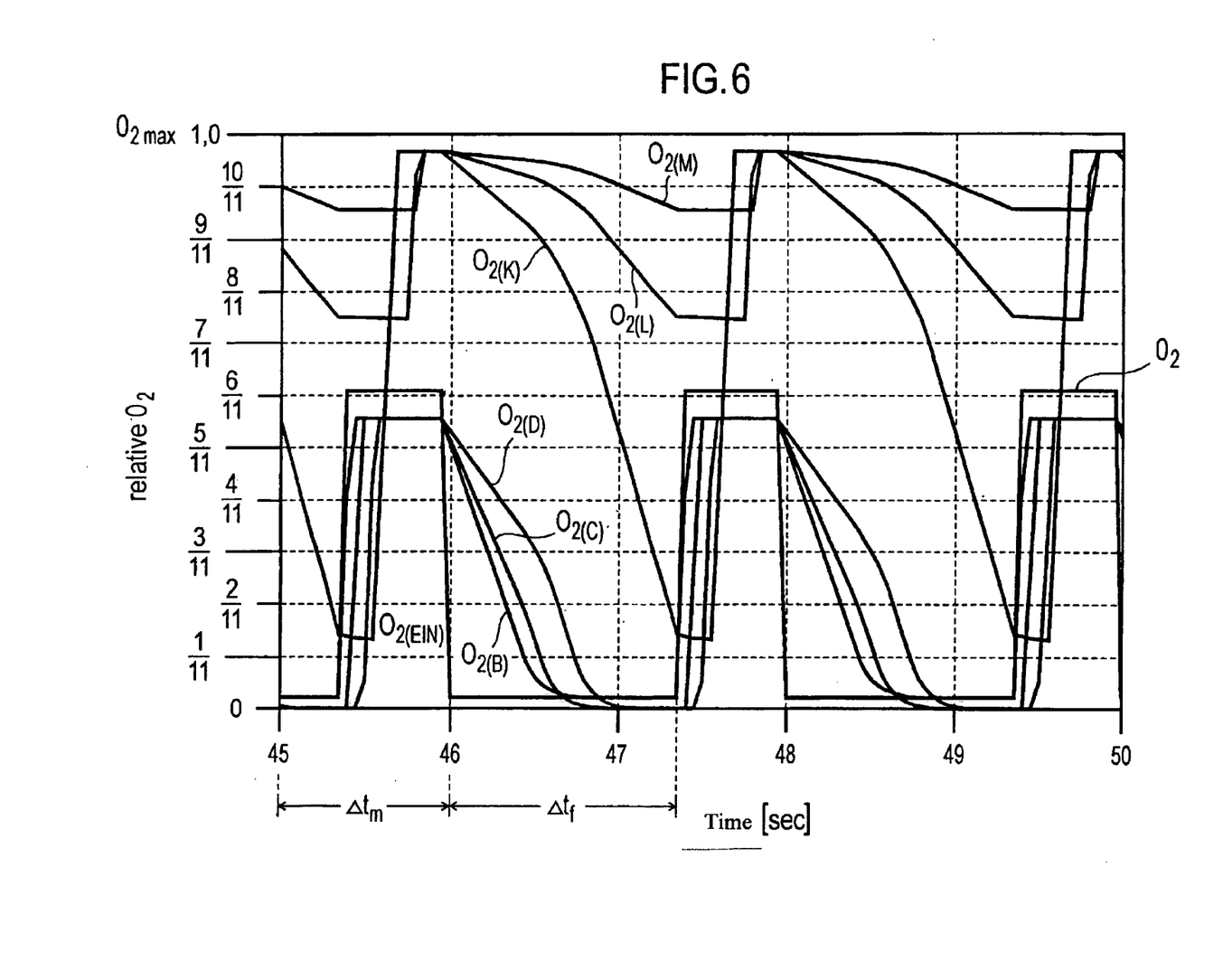
FIG. 6 a diagram illustrating variation of the relative $O_2$ reservoir content of the catalytic converters mounted upstream and downstream over time.

The variation in the stored oxygen over time during the rich-lean-mixture cycle in the oxidation catalyst 3 and in the $NO_x$ adsorber 6 is illustrated on a larger scale in FIG. 6 for a segment between times t=45 seconds and t=50 seconds shown in FIG. 4. In the lean-mixture phases, as for example over the time range from t=45.3 to t=46.0 seconds, the oxygen reservoirs of the oxidation catalyst 3 and the $NO_x$ adsorber 6 are charged, such charging proceeding with a time lag from position B by way of position C and position D of the oxidation catalyst 3 by way of positions K, L, M of the $NO_x$ adsorber 6 shown in FIG. 1. In the rich-mixture phases, for example from times t=45.3 to 46.0 seconds, the oxygen reservoirs are emptied again in the same sequence. Instances are conceivable in which complete emptying of the oxygen reservoir of the $NO_x$ adsorber 6 results in high end pipe emissions and at the same time the rear portion of the $NO_x$ adsorber 6 might become overheated. Consequently, to the extent that this danger exists, the oxygen reservoir of the $NO_x$ adsorber 6 is not emptied completely, but, for example, only to a level of 30 percent.

As is to be seen in FIG. 4, the oxidation catalyst 3 is in this situation heated to temperatures ranging from approximately $0.75 \cdot T_{max}$ to $0.89 \cdot T_{max}$ and the $NO_x$ adsorber 6 to temperatures between $0.65 \cdot T_{max}$ and $0.7 \cdot T_{max}$ so that initiation of carbon combustion may be reliably carried out. The carbon combustion proceeds in a known process not illustrated here. From the $NO_x$ adsorber 6 the exhaust gas heated in this manner of the downstream carbon filter 12 as well is heated in such a way that the carbon collected in it is also burned.

FIG. 4 shows that the CO content increases only slightly at the end of a rich-mixture phase downstream from the $NO_x$ adsorber 6. This indication of rich-phase penetration of the $NO_x$ adsorber 6 is established by the lambda probe 11 downstream from the $NO_x$ adsorber 6 and the lean-mixture phase is initiated immediately when the predetermined threshold value is reached. Similarly, penetration of the transfer by the $NO_x$ adsorber 6 is detected by the lambda probe 9. The rich-mixture phase is initiated immediately when a predetermined threshold value is reached.

Figure 5:
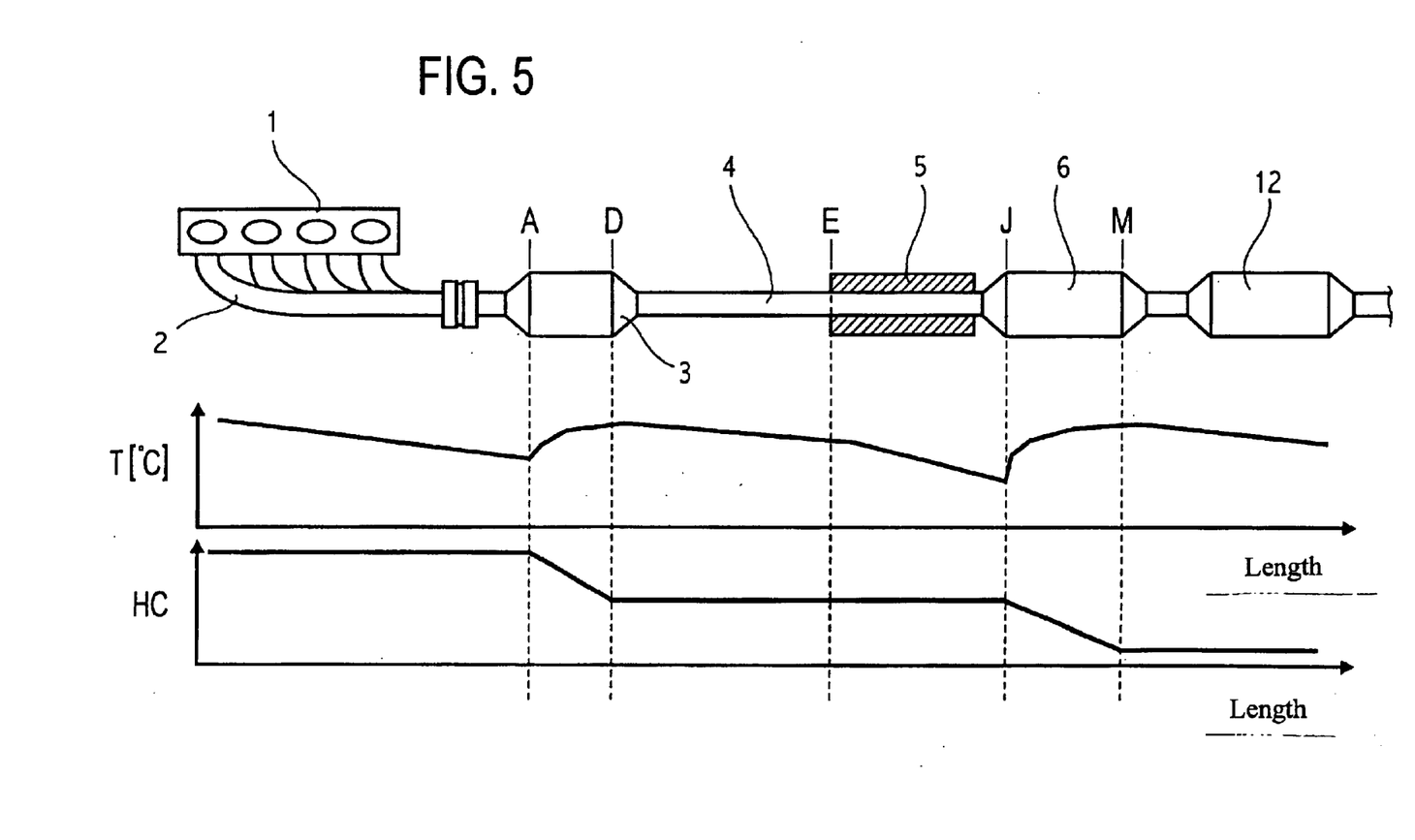
FIG. 5 qualitative illustration of the relative temperature and the measurable amounts of HC in the exhaust gas system over the length of the exhaust gas system in the heated state.

FIG. 5 illustrates the qualitative temperature pattern and exhaust gas pollutant pattern through the example of HC over the length of the exhaust gas system when the desulfatization temperature is reached in the $NO_x$ adsorber 6.

Although the lambda probe 11 is shown in the embodiments of the $\lambda$ value discussed in the foregoing to be mounted between $NO_x$ adsorber 6 and the carbon filter 12, it is also possible to position the lambda probe 11 downstream from the carbon filter 12. It is also conceivable that the lambda probe 9 and/or the wide-angle lambda probe 8 might be positioned in another suitable place in keeping with individual requirements and optionally be replaced by other suitable sensors or omitted if other adequate information relating to the exhaust gas situation is available.

Figure 7:
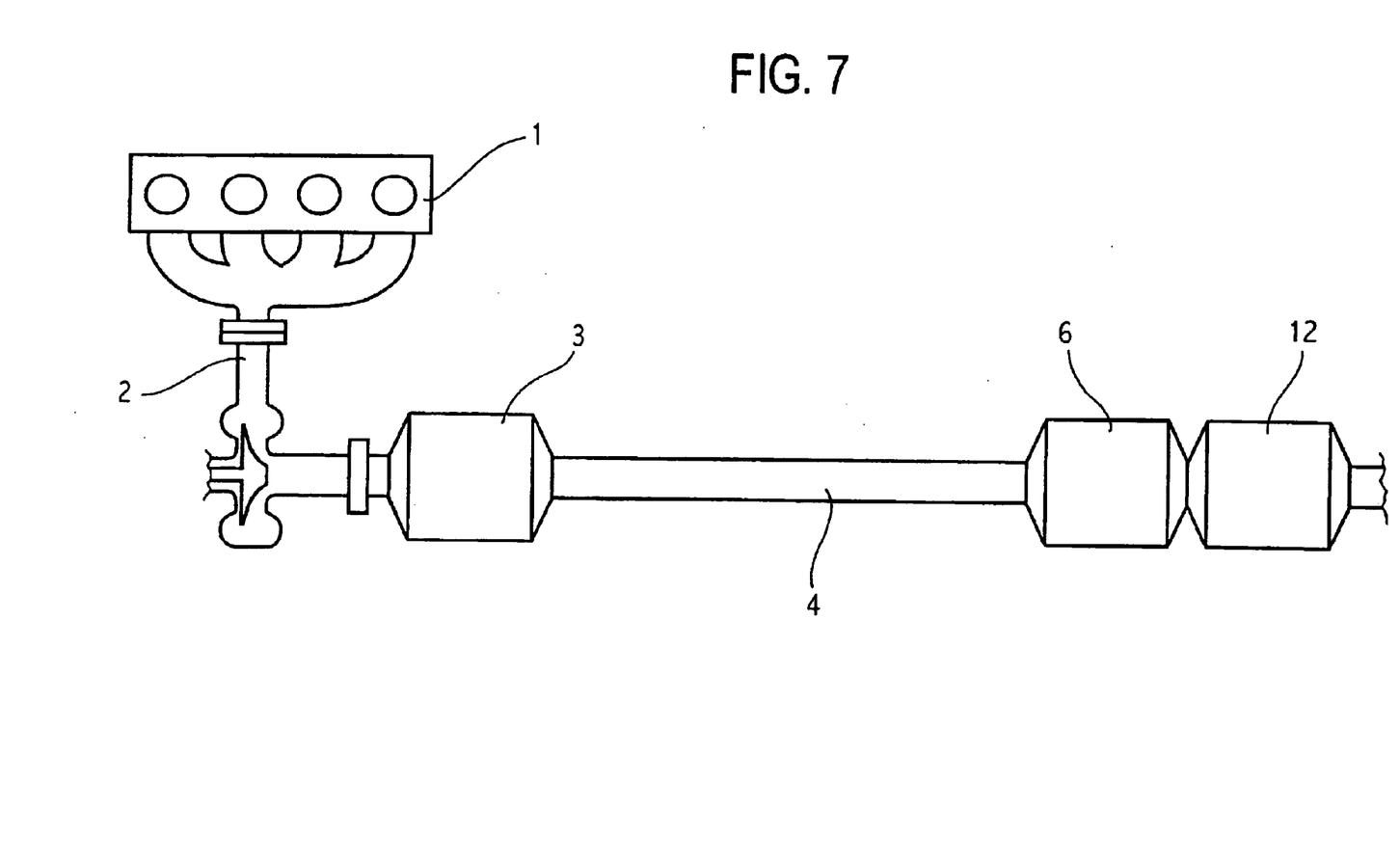
FIG. 7 a diagram illustrating the structure of an alternative embodiment of an exhaust gas system of a direct-injection turbodiesel engine.

FIG. 7 illustrates an exemplary embodiment in which carbon filter 12 is mounted immediately adjacent to the $NO_x$ adsorber 6.

In another embodiment not illustrated the carbon filter 12 and the $NO_x$ adsorber 6 are designed as an integrated component.

Although heat for heating the carbon filter 12 is generated in the embodiments discussed in the foregoing by way of a $NO_x$ adsorber 6 mounted between oxidation catalyst 3 and $NO_x$ adsorber 6, it is also possible to mount, in place of the $NO_x$ adsorber 6 between oxidation catalyst 3 and carbon filter 12, a three-way catalytic converter of a conventional type in which an exothermal reaction is produced by the process described above of variation in the $\lambda$ value, one which heats the three-way catalytic converter and the carbon filter 12 mounted downstream from it to the extent that the carbon collected in it is burned.

To the extent to which such is required, the $\lambda$ value variation may also be used for heating the $NO_x$ adsorber 6 to the desulfatization temperature for the purpose of initiating desulfurization.

Even if the examples presented relate to the exhaust gas system of a diesel engine, the process claimed for the invention may also be applied in other engines with similar exhaust gas problems, ones in which transport for heating of a carbon filter for regeneration may be used.

LIST OF REFERENCE NUMBERS 1 internal combustion engine
2 exhaust gas pipe
3 oxidation catalyst
4 exhaust gas pipe
5 exhaust gas cooler
6 $NO_x$ adsorber
7 exhaust gas pipe
8 wide-angle lambda probe
9 lambda probe
10 temperature sensor
11 combined $NO_x$ and $O_2$ sensor
12 carbon filter

What is claimed is:

1. A process for heating a carbon filter in an exhaust gas system of a diesel engine having a plurality of catalytic converters mounted upstream in the direction of flow from a carbon filter for accumulation of soot,
   characterized in that
   the catalytic converter mounted downstream in the direction of flow and immediately upstream from the carbon filter is heated by transferring the exothermal reaction from a catalyst mounted upstream in the direction of flow, for initiation of detoxification of the downstream catalytic converter, to the downstream catalytic converter, and by introducing heat from the catalytic converter mounted downstream in the direction of flow and immediately upstream from the carbon filter into the carbon filter to the extent that combustion of the carbon is initiated, wherein a displacement is effected by $\lambda$ value regulation with an alternating rich-mixture/lean-mixture operating cycle of the internal combustion engine.

2. The process as claimed in claim 1, wherein the $\lambda$ value is adjusted for heating so that the statement $\lambda=0.95 \geqq \lambda \geqq 0.9$ applies in cyclic rich-mixture operation during heating.

3. The process as claimed in claim 1, wherein control of the rich-lean operating cycle is exerted by means of $O_2$ sensors, $\lambda$ probes in particular, which check the exhaust gas in a position downstream from the catalytic converter.

4. The process as claimed in claim 1, in which at least one upstream catalyst is an oxidation catalyst and at least one downstream catalytic converter is a $NO_x$ adsorber wherein the $NO_x$ adsorber is heated, in particular to the desulfatization temperature, by shifting the exothermal reaction from the oxidation catalyst to the $NO_x$ adsorber.

5. The process as claimed in claim 1, in which at least one upstream catalyst is an oxidation catalyst and at least one downstream catalytic converter is a three-way catalytic converter with oxygen reservoir, wherein the three-way catalytic converter is heated by shifting the exothermal reaction from the first oxidation catalyst to the three-way catalytic converter.

6. The process as claimed in claim 1, wherein the $\lambda$ value is adjusted for heating so that rich-mixture operation with $\lambda<1$ is always maintained somewhat longer than the time allowing the $O_2$ in the oxygen reservoir of the catalyst mounted upstream to convert the pollutants HC and CO, so that the conversion is effected at least in part by the $O_2$ stored in the oxygen reservoir of the catalytic converter mounted downstream, and wherein the two oxygen reservoirs are refilled during lean-mixture operation with $\lambda>1$.

7. The process as claimed in claim 6, wherein the $\lambda$ value is adjusted for heating so that the statement $\lambda=0.95 \geqq \lambda \geqq 0.9$ applies in cyclic rich-mixture operation during heating.

8. The process as claimed in claim 7, wherein control of the rich-lean operating cycle is exerted by means of $O_2$ sensors, $\lambda$ probes in particular, which check the exhaust gas in a position downstream from the catalytic converter.

9. The process as claimed in claim 8, wherein in lean-mixture operation the value of $\lambda$ is measured downstream from the catalytic converter mounted downstream and when such value rises above a predetermined minimum value for $\lambda$ a shift is effected from lean-mixture operation to rich-mixture operation.

10. The process as claimed in claim 8, wherein in rich-mixture operation the value of $\lambda$ is measured downstream from the catalytic converter mounted downstream and when such value falls below a predetermined maximum value for $\lambda$ a shift is effected from rich-mixture operation to lean-mixture operation.

11. The process as claimed in claim 10, wherein in lean-mixture operation the value of $\lambda$ is measured downstream from the catalytic converter mounted downstream and when such value rises above a predetermined minimum value for $\lambda$ a shift is effected from lean-mixture operation to rich-mixture operation.

12. The process as claimed in claim 11, in which at least one upstream catalyst is an oxidation catalyst and at least one downstream catalytic converter is a $NO_x$ adsorber wherein the $NO_x$ adsorber is heated, in particular to the desulfatization temperature, by shifting the exothermal reaction from the oxidation catalyst to the $NO_x$ adsorber.

13. The process as claimed claim 11, in which at least one upstream catalyst is an oxidation catalyst and at least one downstream catalytic converter is a three-way catalytic converter with oxygen reservoir, wherein the three-way catalytic converter is heated by shifting the exothermal reaction from the first oxidation catalyst to the three-way catalytic converter.

14. A process for heating a carbon filter in an exhaust gas system of a diesel engine having a plurality of catalytic converters mounted upstream in the direction of flow from a carbon filter for accumulation of soot, characterized in that the catalytic converter mounted downstream in the direction of flow and immediately upstream from the carbon filter is heated by transferring the exothermal reaction from a catalyst mounted upstream in the direction of flow, for initiation of detoxification of the downstream catalytic converter, to the downstream catalytic converter, and by introducing heat from the catalytic converter mounted downstream in the direction of flow and immediately upstream from the carbon filter into the carbon filter to the extent that combustion of the carbon is initiated, wherein the $\lambda$ value is adjusted for heating so that rich-mixture operation with $\lambda<1$ is always maintained somewhat longer than the time allowing the $O_2$ in the oxygen reservoir of the catalyst mounted upstream to convert the pollutants HC and CO, so that the conversion is effected at least in part by the $O_2$ stored in the oxygen reservoir of the catalytic converter mounted downstream, and wherein the two oxygen reservoirs are refilled during lean-mixture operation with $\lambda<1$.

15. The process as claimed in claim 14, wherein the $\lambda$ value is adjusted for heating so that the statement $\lambda=0.95\geq\lambda\geq0.9$ applies in cyclic rich-mixture operation during heating.

16. The process as claimed in claim 14, in which at least one upstream catalyst is an oxidation catalyst and at least one downstream catalytic converter is a $NO_x$ adsorber wherein the $NO_x$ adsorber is heated, in particular to the desulfatization temperature, by shifting the exothermal reaction from the oxidation catalyst to the $NO_x$ adsorber.

17. The process as claimed in claim 14, in which at least one upstream catalyst is an oxidation catalyst and at least one downstream catalytic converter is a three-way catalytic converter with oxygen reservoir, wherein the three-way catalytic converter is heated by shifting the exothermal reaction from the first oxidation catalyst to the three-way catalytic converter.

* * * * *